US012470033B2

(12) United States Patent
Chen et al.

(10) Patent No.: US 12,470,033 B2
(45) Date of Patent: Nov. 11, 2025

(54) METHOD OF MANUFACTURING AN ELECTRIC CONNECTOR

(71) Applicant: Drapho Electronics Technology., Ltd, Suzhou (CN)

(72) Inventors: ChangYao Chen, Suzhou (CN); ZhuPing Wu, Suzhou (CN); ZhiHong Fang, Suzhou (CN)

(73) Assignee: Drapho Electronics Technology., Ltd, Suzhou (CN)

(*) Notice: Subject to any disclaimer, the term of this patent is extended or adjusted under 35 U.S.C. 154(b) by 557 days.

(21) Appl. No.: 17/934,092

(22) Filed: Sep. 21, 2022

(65) Prior Publication Data

US 2023/0208090 A1 Jun. 29, 2023

(30) Foreign Application Priority Data

Dec. 25, 2021 (CN) ......................... 202111603403.1

(51) Int. Cl.
*H01R 43/16* (2006.01)
*H01R 43/20* (2006.01)

(52) U.S. Cl.
CPC ............. *H01R 43/16* (2013.01); *H01R 43/20* (2013.01)

(58) Field of Classification Search
CPC ........ H01R 43/16; H01R 43/20; H01R 13/03; Y10T 29/49147; Y10T 29/49204; Y10T 29/49208
See application file for complete search history.

(56) References Cited

U.S. PATENT DOCUMENTS 4,292,736 A * 10/1981 Hughes .................. H01R 24/62 439/79
6,461,677 B1 * 10/2002 Copping ................ H01R 43/16 205/133

(Continued)

FOREIGN PATENT DOCUMENTS

CN 102122788 A 7/2011
CN 215989344 U 3/2022

(Continued)

OTHER PUBLICATIONS

First Office Action for Chinese Patent Appl. No. 202111603403.1, dated Apr. 25, 2025.

*Primary Examiner* — Donghai D Nguyen
(74) *Attorney, Agent, or Firm* — Andrus Intellectual Property Law, LLP

(57) ABSTRACT

A method of manufacturing an electric connector includes: providing a metal strip and stamping on the metal strip at a stamping station to obtain a terminal set; packaging and conveying the terminal set to an electroplating station; electroplating and conveying the terminal set to an assembling station; bending and assembling the terminal set into the insulator. The bending operation of the terminal set is transferred to be carried out on the assembling station after the electroplating operation, and is prevented from being carried out at the stamping station. On the one hand, the structure of the terminal set can be kept flat after stamping, which can improve the packaging efficiency and the packaging quantity. On the other hand, the relatively flat structure of the terminal set is more conducive to electroplating treatment, which can improve the electroplating quality and prevent the terminal from deforming.

5 Claims, 2 Drawing Sheets

(56) References Cited

U.S. PATENT DOCUMENTS

| | | | | |
|---|---|---|---|---|
| 9,083,132 | B2 * | 7/2015 | Lee | H01R 43/24 |
| 10,998,675 | B2 * | 5/2021 | Lynch | H01R 13/112 |

FOREIGN PATENT DOCUMENTS

| | | | |
|---|---|---|---|
| CN | 215989386 | U | 3/2022 |
| CN | 215989387 | U | 3/2022 |
| TW | 535334 | B | 6/2003 |

* cited by examiner

METHOD OF MANUFACTURING AN ELECTRIC CONNECTOR

FIELD OF THE INVENTION

This application claims the benefit of Chinese Patent Application No. 202111603403.1, filed on Dec. 25, 2021, entitled "method of manufacturing an electric connector," which is incorporated herein by reference in its entirety.

BACKGROUND OF THE INVENTION

The terminals of existing USB TYPE C electric connectors are basically similar in structure, with a horizontally extending contact arm and vertically extending downward solder tails. The solder tails of the terminals are relatively high, which extend from the rear side of the electric connector and are welded to the surface of the circuit board. After the height of the electric connector is increased, the terminal solder tails A also need to be increased/lengthened, as shown in FIG. 1. In the manufacturing process of an existing electric connector, the conventional method is to stamp terminals in a stamping die, and bend the terminals in the die to get terminal structures conforming to the requirements, then reel and package all the terminals for electroplating operations, and finally assemble the electroplated terminals with an insulator. However, this mode is particularly troublesome for the terminal with high solder tails A. Due to the high solder tails A, the volume of the solder tails is increased after being bent in the die, which affects the subsequent package of the terminals, making the number of the terminals in a single package reduced, and affecting the packaging efficiency. Moreover, if the solder tails of the terminal are relatively high, the terminal is prone to deforming in the subsequent electroplating process, leading to increase of the rejection rate of the terminal, and affecting the volume production.

SUMMARY OF THE INVENTION

A technical problem solved by the present disclosure is to provide a method of manufacturing an electric connector to modify the problem of process technology trouble caused by high welding in the prior art.

To solve above technical problems, the present disclosure employs the following technical solutions: a method of manufacturing an electric connector includes the following steps: providing a metal strip, and stamping on the metal strip at a stamping station to obtain a terminal set; packaging the terminal set and then conveying the terminal set to an electroplating station; electroplating the terminal set at the electroplating station, and then conveying the terminal set to an assembling station; and bending the terminal set at the assembling station, and then assembling the terminal set into an insulator.

Further, stamping on the metal strip at a stamping station to obtain a terminal set specifically includes: stamping on the metal strip to obtain at least one pair of mutually symmetric terminal sets, each of the terminal sets comprising a plurality of terminals, wherein each of the terminals is provided with a horizontal main arm, and the main arm is slender.

Further, during stamping, a head part of each of the terminal sets is always integrally connected to the metal strip, and a tail part of each of the terminal sets is cut off to be separated from the metal strip.

Further, packaging the terminal set and then conveying the terminal set to the electroplating station specifically package include: packaging a plurality of terminal sets jointly, the main arms of the plurality of terminal sets being arranged in a stack.

Further, bending the terminal set on the assembling station specifically includes: bending the main arm of each of the terminal sets, so that the main arm is bent to be L-shaped to form a horizontal contact arm and a vertical welding arm.

Further, assembling the terminal set into an insulator specifically includes: inserting the terminal set into the insulator from a rear side of the insulator, thus enabling the contact arm to enter the insulator while enabling the welding arm to be exposed outside the insulator.

Compared with the prior art, the bending operation of the terminal set is transferred to be carried out on the assembling station after the electroplating operation, the bending operation is prevented from being carried out at the stamping station. On the one hand, the structure of the terminal set can be kept flat after stamping, which can improve the packaging efficiency and the packaging quantity. On the other hand, the relatively flat structure of the terminal set is more conducive to electroplating treatment, which can improve the electroplating quality and prevent the terminal from deforming.

PREFERRED EMBODIMENTS OF THE PRESENT INVENTION

Figure 1:
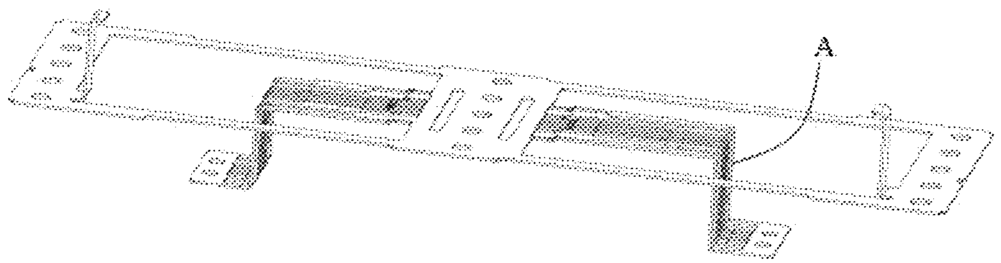
FIG. 1 is a schematic diagram of a structure that a terminal solder tail is bent in a die in the prior art.
Figure 2:
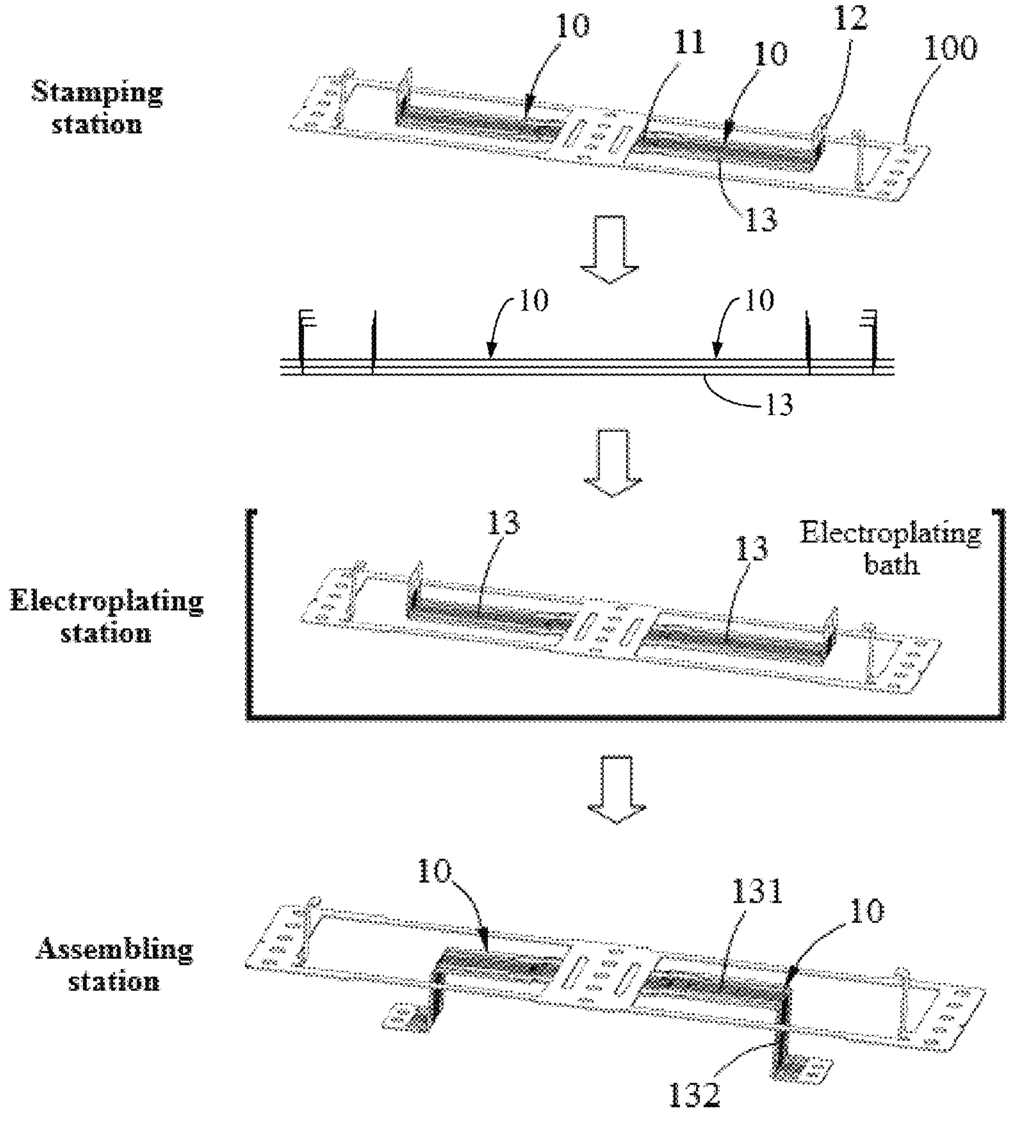
FIG. 2 is a schematic diagram of some steps of a method of manufacturing an electric connector of the present disclosure.

Please refer to FIG. 2, a method of manufacturing an electric connector is provided, which includes the following steps:

- S1: providing a metal strip 100, and stamping on the metal strip 100 at a stamping station to obtain a terminal set 10;
- S2: packaging the terminal set 10 and then conveying the terminal set 10 to an electroplating station;
- S3: electroplating the terminal set 10 at the electroplating station, and then conveying the terminal set 10 to an assembling station; and
- S4: bending the terminal set 10 at the assembling station, and then assembling the terminal set 10 into an insulator 20.

Wherein the step S1 specifically includes: stamping on the metal strip 100 to form a pair of mutually symmetric terminal sets 10, and enabling a head part 11 of each of the terminal sets 10 to be integrally connected to the metal strip 100, and enabling a tail part 12 of each of the terminal sets 10 to be cut off so as to be separated from the metal strip 100, please referring to FIG. 2. After stamping, each of the terminal sets 10 includes a plurality of terminals, and each of the terminals is provided with a horizontal main arm 13. The main arm 13 is slender, and can be bent to form a contact arm 131 and a welding arm 132 of the terminal. The main arm 13 is easy to package and capable of saving a packaging space due to its flat shape. Therefore, after the terminal set 10 is formed after stamping, benefiting by the relatively simple and flat structure of the main arm 13, the terminal set 10 can be rapidly and efficiently packaged and conveyed to the next station: the electroplating station. It needs to be noted that the step S2 specifically includes: packaging a plurality of terminal sets 10 together, the main arms 13 of the plurality of terminal sets 10 being arranged in a stack so as to save the packaging space.

In addition, when carrying out the electroplating treatment at the electroplating station, the terminal set is hard to deform during electroplating treatment as the main arm 13 is relatively flat and not subjected to bending treatment, such that the electroplating quality is improved. During electroplating treatment, the plurality of terminal sets 10 are simultaneously placed in an electroplating bath for electroplating, the electroplating efficiency is improved. The plurality of terminal sets 10 are conveyed to the assembling station after the electroplating is finished.

Figure 3:
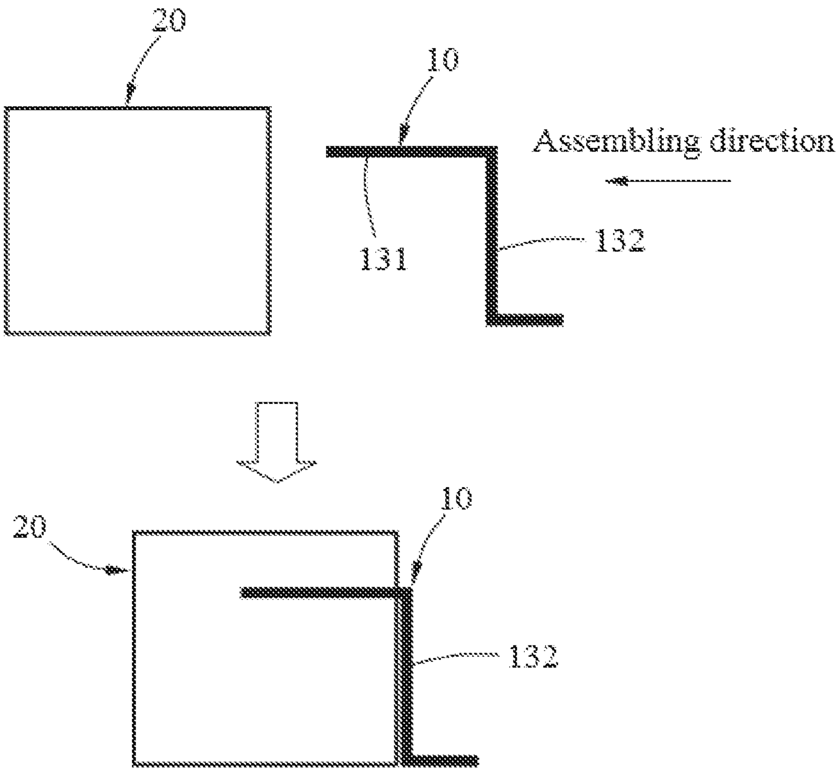
FIG. 3 is a schematic diagram of the terminal set of the present disclosure inserted into the insulator.

As shown in FIG. 3, the assembling station is configured to complete an assembly procedure of the terminal sets 10 and the insulator 20. Taking a USB electric connector as an example, the terminal set 10 is generally inserted into the insulator 20 from the back to the front to complete the assembly of the terminal set and the insulator. In a finished electric connector, the contact arm 131 of the terminal is located in the insulator 20 to achieve electric plugging with a butt-joint end electric connector. While the welding arm 132 of the terminal backwardly extends out of the insulator 20 and vertically and downwardly extends to a circuit board (not shown in figure) so as to be welded and fixed to the circuit board. In a preferred embodiment of the present disclosure, at the assembly station, a mode of bending and then assembling is adopted for the terminal set 10. That is, the main arm 13 of the terminal set 10 is bent into an L shape by using a bending tool to form a horizontal contact arm 131 and a vertical welding arm 132. Then the terminal set 10 is inserted into the insulator 20 from a rear side of the insulator 20, thus enabling the contact arm 131 to enter the insulator 20 while enabling the welding arm 132 to be exposed outside the insulator 20.

In conclusion, the bending operation of the terminal set 10 is transferred to be carried out on the assembling station after the electroplating operation. The bending operation is prevented from being carried out at the stamping station. On the one hand, the structure of the terminal set 10 can be kept flat after stamping, which can improve the packaging efficiency and the packaging quantity. On the other hand, the relatively flat structure of the terminal set 10 is more conducive to electroplating treatment, which can improve the electroplating quality and prevent the terminal from deforming. Such method is particularly suitable for an electric connector with a particularly high welding arm 132. If such welding arm 132 is bent at the stamping station, the volume of the terminal set 10 may be greatly increased due to the structure of the L-shaped main arm 13, which is not conducive to packaging and transporting as well as modifying the electroplating quality. After utilizing the manufacturing method of the present disclosure, these problems can be effectively avoided or modified.

The above is only the preferred embodiment of the present disclosure and is not a limitation of the present disclosure in any form. Any person skilled in the art may make many possible changes and modifications to the technical solution of the present disclosure using the contents of the method revealed above without departing from the scope of the technical solution of the disclosure, which should fall within the scope of protection of the claims.

The invention claimed is:

1. A method of manufacturing an electric connector, comprising the following steps:

providing a metal strip, and stamping on the metal strip at a stamping station to obtain a terminal set;

packaging the terminal set and then conveying the terminal set to an electroplating station;

electroplating the terminal set at the electroplating station, and then conveying the terminal set to an assembling station; and bending the terminal set at the assembling station, and then assembling the terminal set into an insulator;

wherein during stamping, a head part of the terminal set is integrally connected to the metal strip, and a tail part of the terminal set is cut off to be separated from the metal strip and is raised upwards; and wherein during assembling, the head part of the terminal set is located in the insulator for electric plugging, and the tail part of the terminal set is located outside the insulator for welding.

2. The method of manufacturing the electric connector according to claim 1, wherein stamping on the metal strip at a stamping station to obtain a terminal set specifically comprises: stamping on the metal strip to obtain at least one pair of mutually symmetric terminal sets, each of the terminal sets comprising a plurality of terminals, wherein each of the terminals is provided with a horizontal main arm, and the main arm is slender.

3. The method of manufacturing the electric connector according to claim 2, wherein packaging the terminal set and then conveying the terminal set to the electroplating station specifically comprise: packaging a plurality of terminal sets jointly, the main arms of the plurality of terminal sets being arranged in a stack.

4. The method of manufacturing the electric connector according to claim 3, wherein bending the terminal set on the assembling station specifically comprises: bending the main arm of each of the terminal sets, so that the main arm is bent to be L-shaped to form a horizontal contact arm and a vertical welding arm.

5. The method of manufacturing the electric connector according to claim 4, wherein assembling the terminal set into an insulator specifically comprises: inserting the terminal set into the insulator from a rear side of the insulator, thus enabling the contact arm to enter the insulator while enabling the welding arm to be exposed outside the insulator.

* * * * *